(12) United States Patent
Busch et al.

(10) Patent No.: US 9,025,314 B2
(45) Date of Patent: May 5, 2015

(54) MICROPOROUS SEPARATOR-FILM FOR DOUBLE-LAYER CAPACITORS

(75) Inventors: Detlef Busch, Saarlouis (DE); Bertram Schmitz, Sarreguemines (FR); Dominic Klein, Bexbach (DE)

(73) Assignee: Treofan Germany GmbH & Co. KG (DE)

( * ) Notice: Subject to any disclaimer, the term of this patent is extended or adjusted under 35 U.S.C. 154(b) by 294 days.

(21) Appl. No.: 13/637,212

(22) PCT Filed: Dec. 21, 2010

(86) PCT No.: PCT/EP2010/007796
§ 371 (c)(1),
(2), (4) Date: Sep. 25, 2012

(87) PCT Pub. No.: WO2011/076375
PCT Pub. Date: Jun. 30, 2011

(65) Prior Publication Data
US 2013/0021719 A1 Jan. 24, 2013

(30) Foreign Application Priority Data
Dec. 22, 2009 (DE) .................... 10 2009 060 446

(51) Int. Cl.
*H01G 9/00* (2006.01)
*H01M 2/16* (2006.01)
*B29C 47/00* (2006.01)
*B29C 55/00* (2006.01)
*B29C 55/14* (2006.01)
*B32B 5/32* (2006.01)
*C08J 5/18* (2006.01)
*H01G 11/52* (2013.01)
*B29C 47/06* (2006.01)
*B29C 47/14* (2006.01)
*B29C 47/76* (2006.01)
*B29C 47/88* (2006.01)
*B29C 51/36* (2006.01)
*B29K 23/00* (2006.01)
*B29K 105/00* (2006.01)
*B29K 105/04* (2006.01)

(52) U.S. Cl.
CPC ......... *H01M 2/1686* (2013.01); *B29C 47/0021* (2013.01); *B29C 47/065* (2013.01); *B29C 47/14* (2013.01); *B29C 47/763* (2013.01); *B29C 47/767* (2013.01); *B29C 47/8845* (2013.01); *B29C 51/365* (2013.01); *B29C 55/005* (2013.01); *B29C 55/143* (2013.01); *B29K 2023/12* (2013.01); *B29K 2105/0005* (2013.01); *B29K 2105/0088* (2013.01); *B29K 2105/04* (2013.01); *B29K 2105/256* (2013.01); *B32B 5/32* (2013.01); *B32B 2323/10* (2013.01); *C08J 5/18* (2013.01); *C08J 2323/12* (2013.01); *C08J 2323/14* (2013.01); *H01M 2/1653* (2013.01); *Y02E 60/13* (2013.01); *H01G 11/52* (2013.01)

(58) Field of Classification Search
CPC . H01M 2/1686; H01M 2/145; H01M 2/1673; H01G 9/02; H01G 11/52; H01G 9/155; H01G 9/004
USPC ........................................... 362/502; 361/502
See application file for complete search history.

(56) References Cited

U.S. PATENT DOCUMENTS

| 5,231,126 | A | 7/1993 | Shi et al. | |
| 2004/0096744 | A1 | 5/2004 | Sadamitsu et al. | |
| 2010/0047544 | A1* | 2/2010 | Busch et al. | 428/220 |
| 2010/0092791 | A1* | 4/2010 | Busch et al. | 428/458 |
| 2011/0064989 | A1* | 3/2011 | Peters et al. | 429/145 |
| 2011/0064990 | A1 | 3/2011 | Mohr et al. | |

FOREIGN PATENT DOCUMENTS

| DE | 3610644 | A1 | 10/1986 | | |
| EP | 0794583 | B1 | 8/2000 | | |
| EP | 0557721 | B1 | 10/2000 | | |
| EP | 1950821 | A4 | 3/2010 | | |
| EP | 1369221 | B9 | 12/2010 | | |
| JP | 2005171230 | A | 6/2005 | | |
| JP | 2008111134 | A | 5/2008 | | |
| WO | WO2008/025796 | | * | 3/2008 | ............. B32B 27/32 |
| WO | WO2008/040646 | | * | 4/2008 | ................ C08J 5/18 |
| WO | WO2009/132801 | | * | 11/2009 | ............. B32B 27/32 |
| WO | WO-2009/132801 | A1 | 11/2009 | | |
| WO | WO-2009132802 | A3 | 1/2010 | | |

OTHER PUBLICATIONS

International Search Report for PCT/EP2010/007796 mailed Jul. 25, 2011.
International Written Opinion for PCT/EP2010/007796 mailed Jul. 19, 2012.

* cited by examiner

*Primary Examiner* — Dion R Ferguson
(74) *Attorney, Agent, or Firm* — Drinker Biddle & Reath LLP

(57) ABSTRACT

The invention relates to a biaxially orientated, single or multi-layered porous film made of propylene homopolymer and/or propylene block copolymer and ss-nucleation agent. Said film has a Gurley value of between 50 to <400 s and shrinkage in the longitudinal direction of <5% at 100 DEG C./1 hour, and a transverse shrinkage of <10% at 100 DEG C./1 hour.

16 Claims, No Drawings

MICROPOROUS SEPARATOR-FILM FOR DOUBLE-LAYER CAPACITORS

CROSS-REFERENCE TO RELATED APPLICATIONS

This application is a national stage application (under 35 U.S.C. §371) of PCT/EP2010/007796, filed Dec. 21, 2010, which claims benefit of German application 10 2009 060 446.4, filed Dec. 22, 2009.

The present invention relates to a microporous film and its use as a separator in double-layer capacitors, and to a method for production of the film.

Electrochemical double-layer capacitors (DLCs) are gaining increasing importance as supplementary energy sources which close the gaps between conventional batteries and capacitors, since they can provide a high level of electrical power quickly, but only for a short period of time. Such a level of power is required, for example, in uninterrupted power supplies or in newly developed hybrid vehicles. At peak power, for example during acceleration or start-up, the double-layer capacitor can provide this additional power very quickly and can therefore support a provided energy source or supplement a provided generator or bridge a temporary power failure until an emergency unit can be started in a time-delayed manner.

The design and production of DLCs are comparable to those of lithium ion batteries. The energy store in double-layer capacitors is based on the phenomenon of the electrochemical double layer (the "Helmholtz layer"), which forms on the electrodes in a conductive liquid when a voltage is applied. An electrochemical double-layer capacitor basically consists of two electrodes which are dipped into an electrolyte solution and which are separated by a separator. The electrodes are either formed of carbon or else another electrode material of large surface area is coated, for example a metal foil which is coated with a carbon modification. A separator is arranged between the two electrodes and is used to electrically insulate the two electrode layers. This separator has to be porous and has to absorb the electrolyte. It must also be permeable for the electrolyte, in particular for the ions which form by dissociation of the conducting salt dissolved in the electrolyte. Porous materials, for example made of paper, are therefore selected as separators. However, separators made of other materials, for example plastics films, felts or non-woven fabrics made of plastics fibres or glass fibres are also possible.

A single capacitor cell consists of at least two electrodes and an intermediate separator layer. To increase capacitance, a plurality of electrode layers and separator layers are normally stacked one above the other in an alternating manner, for example as a planar stack or in the form of a winding, which is even simpler and saves more space. Once a stack or winding formed of electrodes and separator layers has been produced, it is introduced into a housing and then impregnated with an electrolyte through an impregnation opening. During impregnation, the electrolyte has to fill all the cavities and pores in the separator and in the porous electrode coating and has to displace any gas contained therein out of the winding or stack. Complete impregnation is important because if there is an incomplete exchange between the gas and the electrolyte, subsequent outgassing may occur which, when the capacitor housing is closed, could lead to rupture of the capacitor housing and therefore could destroy the capacitor in a worst case scenario. In addition, if a winding is not saturated completely by electrolyte the capacitance will be lower and the ESR will be higher.

The size of the gap between the two electrodes is determined by the thickness of the separator and, where applicable, by any seals which may be provided. The separator should be thin and very porous to ensure that the electrolyte/separator combination contributes as little as possible to internal resistance. In addition, it should exhibit sufficient stability in the given electrolyte. Different materials are proposed as separators, for example glass fleeces or papers, since these are good at meeting the requirements in terms of high porosity. A high level of porosity contributes approximately quadratically to electrical resistance. In some circumstances, an increase in porosity therefore can be more effective that a reduction in separator thickness. This optimisation as a result of high porosities and low thicknesses is limited, however, by the mechanical stability of the separators, since the separator can be easily pierced in particular if the electrode surfaces are rough, coarse or fibrous.

Porous films which are formed from polyolefins, such as polypropylene and polyethylene, are also known in principle from the prior art. These materials are primarily used as membranes or separators in batteries or accumulators. Different methods are known, in accordance with which polyolefin films of high porosity can be produced: filler methods; cold stretching, extraction methods and β-crystallite methods. These methods differ in principle by the different mechanisms used to produce the pores.

For example, porous films can be produced by the addition of very high filler amounts. With stretching, the pores are created by the incompatibility of the fillers with the polymer matrix. In many applications, the high filler amounts of up to 40% by weight cause undesirable side effects. For example, notwithstanding the stretching operation, the mechanical strength of these porous films is impaired by the high filler amounts.

In the "extraction" methods, the pores are produced in principle by dissolving a component from the polymer matrix using suitable solvents. In this regard, many variants have been developed which differ by the type of additives and by the suitable solvents. Both organic and inorganic additives can be extracted. This extraction can be implemented as the final method step during production of the film or combined with a subsequent stretching operation.

An older method which has proven to be successful in practice is based on stretching of the polymer matrix at very low temperatures (cold stretching). To this end, the film is first extruded in the conventional manner and is then tempered for a few hours to increase the crystalline fraction. In the next method step, cold stretching is carried out in the longitudinal direction at very low temperatures so as to produce a multiplicity of defects in the form of tiny microcracks. This pre-stretched film comprising defects is then stretched at increased temperatures by higher factors, again in the same direction, wherein the defects are enlarged to form pores which form a network-like structure. These films combine high porosities and good mechanical strengths in the direction in which they are stretched, generally the longitudinal direction. The mechanical strength in the transverse direction remains lacking, however, the piercing strength thus being poor and there being a high tendency for splicing in the longitudinal direction. On the whole, the method is cost intensive.

A further method for producing porous films is based on the admixing of β-nucleation agents to polypropylene. Due to the β-nucleation agent, the polypropylene forms "β-crystallite" in high concentrations as the melt cools. The β-phase is converted into the alpha-modification of the polypropylene during the subsequent longitudinal stretching. Since these different crystal forms differ in density, many microscopic defects are also created initially and are ripped open during the stretching operation to form pores. The films produced according to this method have high porosities and good mechanical strengths in longitudinal and transverse direction and are very economical. These films will also be referred to as β-porous films hereinafter. However, most porous films produced by this method have insufficient permeability and mechanical properties to meet the high requirements in the case of use as separators in double-layer capacitors.

It has been found within the scope of the investigations carried out with regard to the present invention that the dimensional stability of the separator also affects the quality of the DLC. In particular in embodiments in which the composite formed of aluminium (as an electrical conductor), electrode and separator is processed to a form a winding, problems occur with separators which exhibit excessive shrinkage, in particular excessive longitudinal shrinkage. Once the winding has been produced, contact wires are welded to the electrodes or to the aluminium conductor at the end faces of said winding and form the electrical contact to the consumer. Temperature loads which may lead to shrinkage of the separator occur during this process. Due to the stresses thus created in the winding, the separator may be ripped open or unevennesses in the electrodes may be pushed through into the separator. Both of these phenomena lead to short circuit, the double-layer capacitor thus becoming unusable.

Furthermore, problems can occur as a result of excessive shrinkage of the separator during production of the DLC, since the winding or the stack is dried before being filled with the electrolyte. Intensive drying before filling is necessary, since the electrodes used generally consist of activated carbon or have an activated carbon coating which absorbs greater amounts of moisture. This moisture has to be removed completely before the winding or stack is filled with electrolyte. This drying process occurs at elevated temperatures, at which the separator has to remain dimensionally stable.

Microporous polypropylene films which are produced with the aid of β-nucleation agents generally have high shrinkage values and therefore are generally unsuitable for use in a DLC. The specific method conditions, which have to be maintained for production of the pores, simultaneously lead to high orientation of the polymer matrix, thus entailing high shrinkage. This problem is intensified in films of high porosities, since the porosity can be improved by stretching at particularly low temperatures and/or by the use of stretching factors which are as high as possible. These conditions lead to a further increase in shrinkage however, and therefore these films ultimately cannot be used as separators in a DLC, despite the improvement in porosity.

The object of the present invention therefore consists in providing a porous film or a separator for double-layer capacitors and improving the useful properties of the double-layer capacitor.

Surprisingly, it is possible to provide a microporous film made of polypropylene which has very high porosity, high permeability and low shrinkage and therefore has a property profile which is required for a separator in a DLC.

The problem addressed by the invention is therefore solved by a biaxially oriented, single- or multi-layered microporous film, the microporosity of which is produced by conversion of β-crystalline polypropylene when the film is stretched, said film comprising at least one porous layer which contains propylene homopolymer and/or propylene block copolymer and β-nucleation agent, wherein the porous film has a Gurley value of <400 s and shrinkage of <5% in the longitudinal direction at 100° C./1 hour, and a transverse shrinkage at 100° C./1 hour of <10%.

Surprisingly, it is possible to provide a β-porous film having very high porosities and high permeability of <400 s, which is also characterised by outstandingly low shrinkage values and is therefore particularly suitable for use as a separator in DLCs. The Gurley value of the film according to the invention generally lies in a range of <400 s, preferably 50 to 300 s, in particular 100 to 250 s.

It has surprisingly been found within the scope of the present invention that, with use of specific measures, it is possible to reduce again the high orientation of the polymer matrix, which is introduced into the film when the pores are produced, and the associated shrinkage without impairing the high porosities, which are desirable. Furthermore, the film is additionally characterised by desirable high mechanical strengths. The modulus of elasticity of the film according to the invention in the longitudinal direction is thus generally 300 to 1800 N/mm$^2$, preferably 400 to 1500 N/mm$^2$, in particular 600 to 1200 N/mm$^2$, and in the transverse direction is 500 to 3000 N/mm$^2$, preferably 800 to 2500 N/mm$^2$, in particular 1000 to 2200 N/mm$^2$.

The film according to the invention comprises at least one porous layer, which is formed of propylene homopolymer and/or propylene block copolymers and contains β-nucleation agent. Additional, other polyolefins may possibly be contained in small amount, provided they do not have a detrimental effect on porosity, shrinkage, permeability and other key properties. Furthermore, the microporous layer possibly additionally contains conventional additives, such as stabilisers and neutralisation agents, in effective amounts in each case.

Suitable propylene homopolymers contain 98 to 100% by weight, preferably 99 to 100% by weight of propylene units and have a melting point (DSC) of 150° C. or above, preferably 155 to 170° C., and generally have a melt flow index of 0.5 to 10 g/10 min, preferably 2 to g/10 min, at 230° C. and a force of 2.16 kg (DIN 53735). Isotactic propylene homopolymers with an n-heptane soluble fraction of less than 15% by weight, preferably 1 to 10% by weight, are preferred propylene homopolymers for the layer. Isotactic propylene homopolymers with a high chain isotacticity of at least 96%, preferably 97 to 99% ($^{13}$C-NMR; Triad methods) can advantageously also be used. These raw materials are known in the prior art as HIPP (high isotactic polypropylene) or HCPP (high crystalline polypropylene) polymers and are characterised by high stereoregularity of the polymer chains, relatively high crystallinity and a relatively high melting point (compared to propylene polymers with a $^{13}$C-NMR isotacticity of 90 to <96%, which likewise can be used).

Propylene block copolymers have a melting point of more than 140 to 170° C., preferably of 145 to 165° C., in particular 150 to 160° C., and a melting range which starts at more than 120° C., preferably in a range of 125 to 140° C. The comonomer content, preferably ethylene content, lies between 1 and 20% by weight for example, preferably between 1 and 10% by weight. The melt flow index of the propylene block copolymers generally lies in a range of 1 to 20 g/10 min, preferably 1 to 10 g/10 min.

The porous layer may possibly additionally contain other polyolefins, provided these do not have a detrimental effect on the properties, in particular porosity, mechanical strength and permeability. For example, other polyolefins are random copolymers of ethylene and propylene with an ethylene content of 20% by weight or less, random copolymers of propylene containing $C_4$ to $C_8$ olefins with an olefin content of 20% by weight or less, terpolymers or propylene, ethylene and butylene with an ethylene content of 10% by weight or less and with a butylene content of 15% by weight or less, or polyethylenes, such as LDPE, VLDPE and LLDPE.

In principle, all known additives which promote the formation of β-crystals of the polypropylene during the cooling of a polypropylene melt are suitable as β-nucleation agents for the porous layer. Such β-nucleation agents and also their efficacy in a polypropylene matrix are known per se in the prior art and will be described hereinafter in detail.

Different crystalline phases of polypropylenes are known. When a melt cools, α-crystalline PP normally forms predominantly, the melting point of which lies at approximately 158 to 162° C. If the temperature is managed in a specific manner, a smaller fraction of β-crystalline phase can be produced as the melt cools and has a much lower melting point of 148 to 150° C. compared to the monoclinic α-modification. In the prior art, additives are known which lead to an increased fraction of β-modification as the polypropylene cools, for example γ-quinacridones, dihydroquinacridines or calcium salts of phthalate acid.

For the purposes of the present invention, highly active β-nucleation agents are preferably used, which produce a β-fraction of 40 to 95%, preferably of 50 to 85% (DSC) during cooling of a propylene homopolymer melt (PP fraction 100%). The β-fraction is determined from the DSC of the cooled propylene homopolymer melt. For example, a two-component β-nucleation system formed of calcium carbonate and organic dicarboxylic acids is preferred and is described in DE 3610644, to which express reference is hereby made. Calcium salts of dicarboxylic acids, such as calcium pimelate or calcium suberate are particularly advantageous, as described in DE 4420989, to which express reference is likewise made. The dicarboxamides described in EP 0557721, in particular N,N-dicyclohexyl-2,6-naphthalene dicarboxamides, are suitable β-nucleation agents.

In addition to the β-nucleation agents, it is important that a specific temperature range and residence times at these temperatures are observed during cooling of the un-stretched melt film in order to achieve a high fraction of β-crystalline polypropylene. The melt film is preferably cooled at a temperature of 60 to 140° C., in particular 80 to 130° C., for example 85 to 120° C. Slow cooling likewise promotes the growth of the β-crystallites, and therefore the take-off speed, that is to say the speed at which the melt film runs over the first cooling roll, should be slow so that the necessary residence times at the selected temperatures are sufficiently long. The take-off speed is preferably less than 25 m/min, in particular 1 to 20 m/min.

The porous layer generally contains 45 to <100% by weight, preferably 50 to 95% by weight, of propylene homopolymers and/or propylene block copolymer and 0.001 to 5% by weight, preferably 50 to 10,000 ppm of at least one β-nucleation agent, based on the weight of the porous layer. Should further polyolefins be contained in the layer, the fraction of the propylene homopolymer or of the block copolymer will be reduced accordingly. Generally, the amount of additional polymers in the layer is 0 to <10% by weight, preferably 0 to 5% by weight, in particular 0.5 to 2% by weight if these are contained additionally. Similarly, said propylene homopolymer or propylene block copolymer fraction is reduced if greater amounts of up to 5% by weight nucleation agent are used. In addition, the layer can contain conventional stabilisers and neutralisation agents, and possibly further additives, in the conventional low amounts of less than 2% by weight.

In a preferred embodiment, the porous layer is formed of a mixture of propylene homopolymer and propylene block copolymer. In these embodiments the porous layer generally contains 50 to 85% by weight, preferably 60 to 75% by weight, of propylene homopolymers and 15 to 50% by weight of propylene block copolymers, preferably 25 to 40% by weight, and 0.001 to 5% by weight, preferably 50 to 10,000 ppm of at least one β-nucleation agent, based on the weight of the layer, and possibly the aforementioned additives such as stabilisers and neutralisation agents. In this case too, further polyolefins may be contained in an amount of 0 to <10% by weight, preferably 0 to 5% by weight, in particular 0.5 to 2% by weight, and the fraction of the propylene homopolymer or of the block copolymer is then reduced accordingly.

Particularly preferred embodiments of the microporous film according to the invention contain 50 to 10,000 ppm, preferably 50 to 5,000 ppm, in particular 50 to 2,000 ppm of calcium pimelate or calcium suberate as β-nucleation agent in the porous layer.

The microporous membrane film can be single- or multi-layered. The thickness of the membrane film generally lies in a range of 10 to 100 µm, preferably 15 to 60 µm, for example 15 to 40 µm. The microporous film can be provided with a corona treatment, flame treatment or plasma treatment so as to improve the filling with electrolyte.

In a multi-layered embodiment, the film comprises further porous layers which are formed as described above, wherein the composition of the different porous layers does not necessarily have to be identical.

The density of the microporous film generally lies in a range of 0.1 to 0.6 g/cm$^3$, preferably 0.2 to 0.5 g/cm$^3$. For use of the film as a separator in double-layer capacitors, the film should have a Gurley value of <400 s. The bubble point of the film should not be above 350 nm, and should preferably be in the range of 50 to 300 nm, and the mean pore diameter should lie in a range of 50 to 100 nm, preferably in a range of 60 to 80 nm.

The film has a longitudinal shrinkage in the longitudinal direction at 100° C. and 1 hour of <5%, preferably 0.5 to 4%, in particular 1 to 3%, and a shrinkage in the transverse direction at 100° C. and 1 hour of <10%, preferably 0.5 to 6%, in particular 1 to 4%. The films are to have a tear strength of >10 N/mm$^2$, preferably >30 N/mm$^2$ in the transverse and longitudinal direction.

The present invention further relates to a method for producing the porous film. According to this method, the porous film is preferably produced by the flat-film coextrusion method, which is known per se. This method is carried out in such a way that the mixture of propylene homopolymer and/or propylene block copolymer and β-nucleation agent of the respective layer is mixed, melted in an extruder, and extruded or coextruded, possibly jointly and simultaneously, through a flat film die onto a take-off roll, on which the single- or multi-layered film is solidified and cooled, with formation of the β-crystallites. The cooling temperatures and cooling times are selected in such a way that the greatest possible fraction of β-crystalline polypropylene is created in the pre-film. This temperature of the take-off roll or of the take-off rolls is generally 60 to 135° C., preferably 80 to 130° C. The residence time at this temperature may vary and should be at least 20 to 300 s, preferably 30 to 100 s. The pre-film thus obtained generally contains a fraction of β-crystallites of 40 to 95%, preferably 50 to 85%.

This pre-film containing a high fraction of β-crystalline polypropylene is then stretched biaxially in such a way that the β-crystallites are converted during the stretching process into α-crystalline polypropylene and a network-like porous structure is formed. The biaxial stretching (orientation) is generally carried out successively, wherein the film is preferably firstly stretched longitudinally (in the direction of the machine) and then transversely (perpendicular to the direction of the machine).

For stretching in the longitudinal direction, the cooled pre-film is first guided over one or more heating rolls, which heat the film to the suitable temperature. This temperature is generally below 140° C., preferably 70 to 120° C. Longitudinal stretching is then generally carried out with the aid of two different high-speed rolls running in accordance with the desired stretch ratio. The longitudinal stretch ratio lies in a range of 2:1 to 5:1, preferably 3:1 to 4.5:1. After this stretching operation, the film is first cooled again over rolls of suitable temperature. It is particularly advantageous in one embodiment of the method according to the invention to cool the film only slightly after longitudinal stretching by keeping these cooling rolls at a temperature of more than 80° C., preferably at a temperature of 85 to 130° C., in particular at 90 to 120° C. A temperature from these specified ranges which lies 5 to 20° C., preferably 10 to 15° C., below the longitudinal stretching temperature is preferably selected. The longitudinally stretched film should experience a sufficiently long residence time at this increased temperature, for example of 30 to 60 s, preferably 35 to 55 s. The temperature is then increased again in the "heating fields" to the transverse stretching temperature, which generally lies at a temperature of 120 to 145° C. Transverse stretching is then carried out with the aid of a corresponding stenter frame, wherein the transverse stretching ratio lies in a range of 2:1 to 9:1, preferably 3:1 to 8:1.

After biaxial stretching, a surface of the film is possibly corona-, plasma- or flame-treated by one of the known methods. Lastly, heat setting (heat treatment) is carried out in a further variant of the production method according to the invention, wherein the film is kept at a temperature of 120 to 150° C., preferably at 130 to 145° C., for 5 to 500 s for example, preferably 10 to 300 s, for example via rollers or an air heater box. Lastly, the film is wound up in a conventional manner using a winding device.

The film may be converged directly before or during the heat setting operation, wherein the convergence is preferably 5 to 25%, in particular 8 to 20%. Convergence is understood to mean a slight drawing together of the transverse stretching frame so that the maximum width of the frame which is given at the end of the transverse stretching process is greater than the width at the end of the heat setting operation. Of course, the same applies to the width of the film web. The degree to which the transverse stretching frame is coalesced is given as convergence and is calculated from the maximum width of the transverse stretching frame $B_{max}$ and the end film width $B_{film}$ in accordance with the following formula:

Convergence[%]=100×$(B_{max}-B_{film})/B_{max}$

The method conditions during the method according to the invention for producing the porous films differ from the method conditions which are normally maintained with the production of a biaxially oriented film. To achieve high porosity, the cooling conditions during solidification to form the pre-film as well as the temperatures and factors during the stretching process are critical. Firstly, a high fraction of β-crystallites has to be achieved in the pre-film by correspondingly slow and moderate cooling, that is to say at relatively high temperatures. During the subsequent longitudinal stretching, the β-crystals are converted into the alpha modification, whereby imperfections are created in the form of microcracks. The longitudinal stretching must be carried out at relatively low temperatures so as to ensure that these imperfections are created in sufficient number and in the correct form. The same applies to the temperature during transverse stretching, as a result of which the imperfections are ripped open to form pores, thus creating the characteristic network structure of these porous films.

These temperatures during longitudinal and transverse stretching, which are low compared to conventional boPP processes, require high stretching forces, which increase the risk of separation on the one hand, and introduce high orientation into the polymer matrix on the other hand. The process therefore is all the more critical, the greater the porosity of the film is to be. At the same time, high orientation of the polymer matrix causes high shrinkage of the film.

For these reasons, high porosity is inevitably accompanied by high shrinkage values for a β-porous film. The greater the desired porosity, the lower the temperatures have to be during the stretching operation and the higher the stretching factors have to be. Both factors inevitably lead to a further increase in shrinkage.

It has been found within the scope of the present invention that it is still possible to produce a film having high porosities and low shrinkage if one or more of the above-described measures is/are adopted, preferably if the film is subjected to heat setting at high temperatures once it has been stretched biaxially. Surprisingly, a heat treatment of this type is only detrimental to porosity to an insignificant extent, and therefore the heat-treated film still has the desired high porosity, even after this measure. Surprisingly, it is possible to reduce shrinkage by a sufficiently high temperature during this heat treatment to such an extent that it is up to 80% less compared to before this heat treatment, or is up to 80% less compared to heat treatment at a lower temperature. It has been found that the longer the film is kept at the corresponding temperature, the further shrinkage can be reduced. It is this also possible, either alternatively or in addition, to increase the residence time at the respective temperature by correspondingly long setting fields and to thus reduce shrinkage of the film. Guidance of the film in a converging manner in the region of the heat setting also assists the reduction in shrinkage.

In addition, a further, alternative or additional method measure was also found which causes a similar reduction in the high shrinkage and additionally contributes to a reduction in shrinkage without having a detrimental effect on the high porosity. For example, films with low shrinkage and high porosities are also obtained if the cooling roll has a high temperature after longitudinal stretching of more than 80° C. for example and if the film is kept at this temperature for a sufficient period of time.

The above-described measures could also be combined together in a suitable manner if necessary. The method according to the invention thus enables the production of a new porous film which has shrinkage values which could not previously be implemented in conjunction with the high porosities of less than 400 s. A film can thus be provided which, due to the high permeabilities, is suitable for use in DLCs and also meets the requirements of low shrinkage values. The porous film demonstrates considerable advantages compared to paper separators or non-wovens. In addition to the high porosities and low shrinkage values, the microporous film is characterised by much improved mechanical strength.

With use of the film according to the invention as a separator in a DLC, the activated carbon or the activated carbon coating of the electrodes can be completely dried under conventional conditions before filling with the electrolyte. The film according to the invention remains dimensionally stable under these conditions and does not lead to the described defects, caused by undesired shrinkage, as a result of the thermal loads during the process of producing the DLC. No failures are experienced after welding of the contact wires to the filled winding, which likewise is attributed to the excellent dimensional stability of the film.

The following measurement methods were used for characterisation of the raw materials and of the films:

Melt Flow Index

The melt flow index of the propylene polymers was measured according to DIN 53 735 at a load of 2.16 kg and at 230° C.

Melting Point

Within the context of the present invention, the melting point is the maximum of the DSC curve. To determine the melting point, a DSC curve was measured with a heating and cooling rate of 10K/1 min in the range of 20 to 200° C. As is usual, the second heating curve was then evaluated, cooled at 10K/1 min in the range of 200 to 20° C., to determine the melting point.

B-Content of the Pre-Film

The β-content of the pre-film was determined likewise by a DSC measurement which was carried out on the pre-film as follows: The pre-film was first heated in DSC to 220° C. at a heating rate of 10 K/min, melted and then cooled again. From the first heating curve, the degree of crystallinity $K_{\beta,DSC}$ was determined as the ratio of the melt enthalpies of the β-crystalline phase ($H_\beta$) to the sum of the melt enthalpies of β- and α-crystalline phase ($H_\beta + H_\alpha$).

$$K_{\beta,DSC}[\%] = 100 \times H_\beta/(H_\beta + H_\alpha)$$

Density

Density was determined according to DIN 53 479, method A.

Porosity

The reduction in density ($\rho_{Sep} - \rho_{pp}$) of the separator film compared to the density of the pure polypropylene $\rho_{pp}$ was calculated as porosity as follows:

$$\text{Porosity}[\%] = 100 \times (\rho_{Sep} - \rho_{pp})/\rho_{pp}$$

Permeability (Gurley Value)

The permeability of the films was measured using Gurley tester 4110 according to ASTM D 726-58. The time (in sec) required for 100 cm$^3$ of air to permeate through the surface of a label measuring 1 inch$^2$ (6.452 cm$^2$) was determined. The pressure difference over the film corresponds to the pressure of a water column 12.4 cm tall. The time required corresponds to the Gurley value.

Shrinkage:

The longitudinal and transverse shrinkage values are based on the respective linear expansion of the film (longitudinally $L_0$ and transversely $Q_0$) before the shrinkage process. The longitudinal direction was the direction of the machine, whilst the direction perpendicular to the direction in which the machine runs was defined accordingly as the transverse direction. The test specimen of 10*10 cm$^2$ was shrunk in a circulating air oven at the respective temperature (100° C.) over a period of 60 min. The remaining linear expansions of the test specimen were then determined again longitudinally and transversely ($L_1$ and $Q_1$). The difference of the established linear expansions compared to the original length $L_0$ and $Q_0$ times 100 was then given as shrinkage in %.

$$\text{longitudinal shrinkage } L_s[\%] = \frac{L_0 - L_1}{L_0} * 100[\%]$$

$$\text{transverse shrinkage } Q_s[\%] = \frac{Q_0 - Q_1}{Q_0} * 100[\%]$$

This method for determining the longitudinal and transverse shrinkage corresponds to DIN 40634.

The invention will now be explained by the following examples.

Example 1

After the extrusion method, a single-layered pre-film was extruded from a flat film die at an extrusion temperature of 240 to 250° C. in each case. This pre-film was first taken off and cooled on a cooling roll. The pre-film was then heated to the longitudinal stretching temperature and stretched longitudinally over various, high-speed rolls. The film was then guided over cooling rolls and cooled. The film was then guided into the heating fields of the transverse stretching frame, heated to the transverse stretching temperature, and oriented in the transverse direction. After this transverse orientation, heat setting was carried out, during which the film was converged. The film had the following composition:

approximately 80% by weight highly isotactic propylene homopolymer (PP) with a $^{13}$C-NMR isotacticity of 97% and an n-heptanol fraction of 2.5% by weight (based on 100% PP) and a melting point of 165° C.; and a melt flow index of 2.5 g/10 min at 230° C. and 2.16 kg load (DIN 53 735)

and approximately 20% by weight propylene ethylene block copolymer with an ethylene fraction of 5% by weight, based on the block copolymer, and an MFI (230° C. and 2.16 kg) of 6 g/10 min and a melting point (DSC) of 165° C. and 0.04% by weight Ca pimelate as β-nucleation agent.

The film additionally contained a stabiliser and neutralisation agent in both layers in conventional, low amounts.

More specifically, the following conditions and temperatures were selected during production of the film:

| | |
|---|---|
| extrusion: | extrusion temperature 235° C. |
| take-off roll: | temperature 125° C. |
| take-off speed: | 4 m/min |
| longitudinal stretching: | stretching roll T = 90° C. |
| longitudinal stretching by: | factor 3.0 |
| temperature of the cooling roll after longitudinal stretching: | 90° C. |
| residence time on cooling roll: | 40 s |
| transverse stretching: | heating fields T = 125° C. |
| stretching fields: | T = 125° C. |
| transverse stretching by: | factor 5.0 |
| setting: | T = 140° C. |
| convergence: | 15% |
| residence time in the setting field: | 20 s |

The porous film thus produced was approximately 25 μm thick. The film had a density of 0.34 g/cm$^3$ and had a uniform white/opaque appearance.

Example 2

A film was produced as described in Example 1. In contrast to Example 1, the convergence was reduced from 15% to 10% during heat setting. Otherwise, the composition of the film was unchanged and the other method conditions were maintained.

Example 3

A film was produced as described in Example 2. In contrast to Example 2, the temperature of the cooling roll was increased from 90° C. to 110° C. after longitudinal stretching. Otherwise, the composition of the film was unchanged and the other method conditions were maintained.

Example 4

A film was produced as described in Example 2. In contrast to Example 2, the temperature during setting was increased from 140° C. to 145° C. Otherwise, the composition of the film was unchanged and the other method conditions were maintained.

Example 5

A film was produced as described in Example 2. In contrast to Example 2, the setting time by heating a further segment of the setting field was increased from 20 s to 40 s. Otherwise, the composition of the film was unchanged and the other method conditions were maintained.

Example 6

A film was produced as described in Example 2. In contrast to Example 2, a film having a thickness of 40 µm was produced. Otherwise, the composition of the film was unchanged and the other method conditions were maintained.

Comparative Example 1

A film was produced as described in Example 2. In contrast to Example 2, the temperature during setting was reduced from 140° C. to 110° C. Otherwise, the composition of the film was unchanged and the other method conditions were maintained.

Comparative Example 2

A film was produced as described in Example 2. In contrast to Example 2, the temperature during setting was reduced from 140° C. to 90° C. Otherwise, the composition of the film was unchanged and the other method conditions were maintained.

Comparative Example 3

A film was produced as described in Example 2. In contrast to Example 2, the temperature of the longitudinal stretching was increased from 90° C. to 120° C. Otherwise, the composition of the film was unchanged and the other method conditions were maintained.

Comparative Example 4

A film was produced as described in Example 2. In contrast to Example 2, the temperature of the transverse stretching was increased from 125° C. to 155° C. Otherwise, the composition of the film was unchanged and the other method conditions were maintained.

The properties of the films according to the examples and comparative examples are summarised in the table below. It can be seen that only those films produced by the method according to the invention have the desired combination of properties (high porosity and low shrinkage), whereas other measures for reducing shrinkage also have a considerably detrimental effect on porosity. Only those films in accordance with the examples according to the invention therefore are suitable for use in DLCs.

TABLE

| | Thickness [µm] | Density [g/cm³] | Porosity [%] | Gurley [s] | T [° C.] Cooling roll MD | Time [s] Cooling roll MD | T [° C.] Setting | Time [s] Setting | Convergence [%] | Shrinkage MD [%] 1 h@100° C. | Shrinkage TD [%] 1 h@100° C. | Pin holes |
|---|---|---|---|---|---|---|---|---|---|---|---|---|
| Ex. 1 | 25 | 0.34 | 63 | 150 | 90 | 40 | 140 | 20 | 15 | 2.7 | 1.2 | no |
| Ex. 2 | 25 | 0.33 | 64 | 140 | 90 | 40 | 140 | 20 | 10 | 2.2 | 3.2 | no |
| Ex. 3 | 25 | 0.34 | 63 | 150 | 110 | 40 | 140 | 20 | 10 | 1.4 | 3.0 | no |
| Ex. 4 | 25 | 0.34 | 63 | 158 | 90 | 40 | 145 | 20 | 10 | 2.0 | 2.5 | no |
| Ex. 5 | 25 | 0.26 | 72 | 95 | 90 | 40 | 140 | 40 | 5 | 2.2 | 3.3 | no |
| Ex. 6 | 40 | 0.33 | 64 | 160 | 90 | 40 | 140 | 20 | 10 | 3.7 | 3.6 | no |
| CE 1 | 25 | 0.32 | 60 | 140 | 90 | 40 | 110 | 20 | 10 | 6.2 | 10.5 | yes |
| CE 2 | 25 | 0.32 | 60 | 130 | 90 | 40 | 90 | 20 | 10 | 10.1 | 24 | yes |
| CE 3 | 25 | 0.45 | 51 | 950 | 90 | 40 | 110 | 20 | 10 | 4.2 | 6.3 | |
| CE 4 | 25 | 0.6 | 36 | 2400 | 90 | 40 | 110 | 20 | 10 | 3.8 | 4.5 | |

The invention claimed is:

1. A biaxially oriented, single- or multi-layered porous film, the porosity of which is produced by conversion of β-crystalline polypropylene when the film is stretched, said film comprising at least one porous layer, this layer containing propylene homopolymer and/or propylene block copolymer and β-nucleation agent, wherein the film has a Gurley value of 50 to 400 s and shrinkage in the longitudinal direction of <5% at 100° C./1 hour, and a transverse shrinkage at 100° C./1 hour of <10% and the film having a tear strength of >30 N/mm² and the film further having a modulus of elasticity in the longitudinal direction of from 300 to 1800 N/mm² and in the transverse direction of from 500 to 3000 N/mm².

2. The film according to claim 1, wherein the propylene homopolymer is a highly isotactic polypropylene with chain isotaxy (13C-NMR) of 96 to 99%.

3. The film according to claim 1, wherein the propylene homopolymer is an isotactic polypropylene with chain isotaxy (13C-NMR) of 90 to <96%.

4. The film according to claim 1, wherein the nucleation agent is a calcium salt of pimelic acid or suberic acid or is a carboxamide.

5. The film according to claim 1, wherein the film contains propylene homopolymer and propylene block copolymer and β-nucleation agent.

6. The film according to claim 1, wherein the film contains 50 to 85% by weight propylene homopolymer, 15 to 50% by weight propylene block copolymer, and 50 to 10,000 ppm β-nucleation agent.

7. The film according to claim 1, wherein the density of the film lies in a range of 0.1 to 0.5 g/cm$^3$.

8. The film according to claim 1, wherein the film has a thickness of 10 to 100 μm.

9. The film according to claim 1, wherein the film is made by a process which comprises melting at least one mixture of propylene homopolymer and/or propylene block copolymer and β-nucleation agent in an extruder and is extruded through a flat film die onto a take-off roll on which the melt film cools and solidifies, with formation of β-crystallites, and this film is then stretched in the longitudinal direction and then in the transverse direction, wherein the biaxially stretched film is heat-treated at a temperature of 120 to 150° C. after the transverse stretching.

10. The film according to claim 9, which comprises melting at least one mixture of propylene homopolymer and/or propylene block copolymer and β-nucleation agent in an extruder and is extruded through a flat film die onto a take-off roll on which the melt film cools and solidifies, with formation of β-crystallites, and this film is then stretched in the longitudinal direction and then in the transverse direction, wherein the longitudinally stretched film is cooled to a temperature of 85 to 130° C. after the longitudinal stretching.

11. The film according to claim 10, wherein the biaxially stretched film is cooled after the longitudinal stretching to a temperature which lies 5 to 20° C. below the longitudinal stretching temperature.

12. The film according to claim 9, wherein the film is converged after the transverse stretching and the convergence is 5 to 25%.

13. A separator in a double-layer capacitor which comprises the film according to claim 1.

14. A double-layer capacitor containing the film according to claim 1 as a separator.

15. A process for producing the double-layer capacitor as claimed in claim 14 which comprises drying the activated carbon or the activated carbon coating of the at a temperature of 80 to 100° C. before being filled with the electrolyte.

16. The double-layer capacitor according to claim 14, which comprises an electrode comprising activated carbon or having an activated carbon coating.

* * * * *